(12) United States Patent
Chen

(10) Patent No.: US 8,137,122 B2
(45) Date of Patent: Mar. 20, 2012

(54) MINI POWER SUPPLY MODULE

(75) Inventor: Yuan Chin Chen, Taipei County (TW)

(73) Assignee: Portwell, Inc., Shulin, Taipei County (TW)

( * ) Notice: Subject to any disclaimer, the term of this patent is extended or adjusted under 35 U.S.C. 154(b) by 148 days.

(21) Appl. No.: 12/764,506

(22) Filed: Apr. 21, 2010

(65) Prior Publication Data

US 2011/0161684 A1    Jun. 30, 2011

(30) Foreign Application Priority Data

Dec. 30, 2009  (TW) ................................ 98145783 A

(51) Int. Cl.
*H01R 13/62* (2006.01)
(52) U.S. Cl. .................... 439/326; 439/131; 361/785
(58) Field of Classification Search ............... 439/31, 439/131, 326; 361/785, 796
See application file for complete search history.

(56) References Cited

U.S. PATENT DOCUMENTS

| 5,049,511 | A  | * | 9/1991  | Yu ................................ 439/325 |
| 5,174,779 | A  | * | 12/1992 | Chung ........................... 439/326 |
| 7,311,525 | B2 | * | 12/2007 | Koiwaya et al. ............... 439/31 |
| 7,539,023 | B2 | * | 5/2009  | Bulucea ......................... 361/785 |

* cited by examiner

*Primary Examiner* — Truc Nguyen
(74) *Attorney, Agent, or Firm* — Morris Manning & Martin LLP; Tim Tingkang Xia, Esq.

(57) ABSTRACT

The present invention discloses a mini power supply module comprising a circuit board and a power connector. Said power connector is abutted and electrically connected with said power connector through coupling parts. Said power connector is provided with an orientating mechanism to change the angle between said power connector and said circuit board. Said power connector is further included with an input port for receiving the input of an external power source, a contact terminal for matching with the connector on motherboard, and at least one output port for outputting power to peripheral devices.

12 Claims, 6 Drawing Sheets

MINI POWER SUPPLY MODULE

CROSS-REFERENCE TO RELATED PATENT APPLICATION

This application claims priority to and the benefit of Taiwan Patent Application No. 098145783, filed Dec. 30, 2009, the contents of which are incorporated herein in their entireties by reference.

BACKGROUND OF THE INVENTION

1. Field of the Invention

The present invention relates to a power supply. More specifically, is directed to a mini power supply module capable of altering the included angle between the components thereof to better accommodate in the condition with smaller installation clearance.

2. Description of the Related Art

Nowadays, the conventional power supply utilized in the desktop PC system is mostly designed in formal, strict standard, such as the specifications confining to the dimension of AT, ATX, micro ATX, and ITX motherboard. Such power supply consists mainly of a sheet metal housing, a circuit board, and multiple wiring harnesses. The circuit board, which is provided and protected inside the sheet metal housing, is essentially the primary functional component of the power supply. The external power supply, such as those from electric utility or uninterrupted power system (UPS), is electrically coupled with the circuit board inside the power supply via the input port on the sheet metal housing to transmit the electric power which may be subsequently performed with voltage regulation and transformation processes. The wiring harness connected with said internal circuit board is extended out of the sheet metal housing through the opening, wherein the terminal of said harness is provided with various connectors, such as 20/24-pin ATX main power connector, 4-pin 12V P4 connector, 4-pin parallel connector, 4-pin floppy drive connector, and 6-pin AUX connector, etc, to supply regulated and transformed electric power to multiple peripheral devices installed in the computer system. Due to their cumbersome volume and fixed size, such supply power is typically secured on the predetermined position inside the system case by fasteners. From there the electric power from external power source may be distributed through the wiring harnesses to those electronic devices (ex. motherboard, CD-ROM drive, floppy disk drive, or hard disk, etc) in the system case. For above-mentioned reason, conventional power supply can't provide satisfactory flexibility and adaptability in the strict arrangement of computer system.

Furthermore, thank to the rapid progress in the electronic technology, more and more powerful mini-PC system/device are successively developed and presented to the customers. Such system has the same constitution and configuration just as the general computer system, but with significantly smaller size, especially for those applied in the field of industrial PC system, embedded PC system, and in-car infotainment system. Those mini-PC systems are characterized by their miniaturization feature, diverse system specifications, and must change its design frequently for better customization. In such situation, conventional power supply with cumbersome, bulky housing may not be appropriately integrated into this kind of miniaturized PC system. For this reason, the so-called ultra compact "power supply module" is contemplated and developed in the Industry. Such power supply module is free from cumbersome, bulky housing. Instead, the circuit board once disposed inside the housing is scaled down enough to fit and adjoin with the power connector (ex. 24-pin ATX main power connector) that functions as the output terminal of power supply. In real use, this kind of mini power supply module is plugged directly on the motherboard, just like a regular PCI expansion card, without using sheet metal housing to be secured on the system case. Therefore, such mini power supply module occupies only a small amount of installation space above the motherboard such that it may better accommodates in the miniaturized system. It also saves the cost for additional component, such as metal housing and wiring harness.

However, even the space occupied by the power supply module is quite small, there is still some geometric limitation that may hinder the power supply module from being installed in the system case. For example, the lack of clearance in height of system case during the assembly of circuit board and power connector, or the power supply module being blocked by the components installed in the system case. Therefore, it is necessary to improve the structure design for this kind of mini power supply module.

SUMMARY OF THE INVENTION

In the light of above-identified disadvantages in prior art, the present invention discloses a novel mini power supply module capable of altering the included angle between the components thereof. The included angle between circuit board and power connector of said mini power supply module may be changed via an orientating mechanism for better accommodating the whole power supply module to the limited space in the PC system case.

The mini power supply module of present invention comprises a circuit board and a power connector which are electrically coupled and adjoined with each other by the coupling members. An orienting mechanism is provided on said mini power supply module to alter the included angle between the power connector and the circuit board. Said power connector is further provided with an input port for receiving the electrical energy from external power source, a contact terminal for matching with the power connector on motherboard, and one or more output ports for supplying the electrical energy to the peripheral devices.

In one aspect of present invention, a mini power supply module is provided with hinge member to enable the circuit board to rotate pivotally on the power connector for changing the included angle therebetween.

In another aspect of present invention, a mini power supply module is provided with a plurality of slots formed on the power connector to receive the circuit board in order to change the included angle between the power connector and the circuit board.

In another aspect of present invention, a mini power supply module is provided with an input port formed on its power connector for receiving the electrical energy from external power source.

In still another aspect of present invention, a mini power supply module is provided with one or more output port formed on its power connector for supplying the electrical energy to the peripheral devices.

In still another aspect of present invention, a mini power supply module is provided with shield components covering on its circuit board for protection and heat dissipation.

Other aspects will become apparent after review of the hereinafter set forth Brief Description of the Drawings, Description, and the Claims.

BRIEF DESCRIPTION OF THE DRAWINGS

The exemplary system and method of the present invention will be fully understood from the detailed description given below and from the accompanying drawings of various aspects of the invention. Non-limiting and non-exhaustive embodiments of the present invention are described herein with reference to the following drawings. The components in the drawings are not necessarily to scale, emphasis instead being placed upon illustrating the principles of the invention. In the drawings, like reference numerals refer to like parts throughout the various figures unless otherwise specified, wherein.

DETAILED DESCRIPTION OF THE PREFERRED EMBODIMENTS

Figure 1:
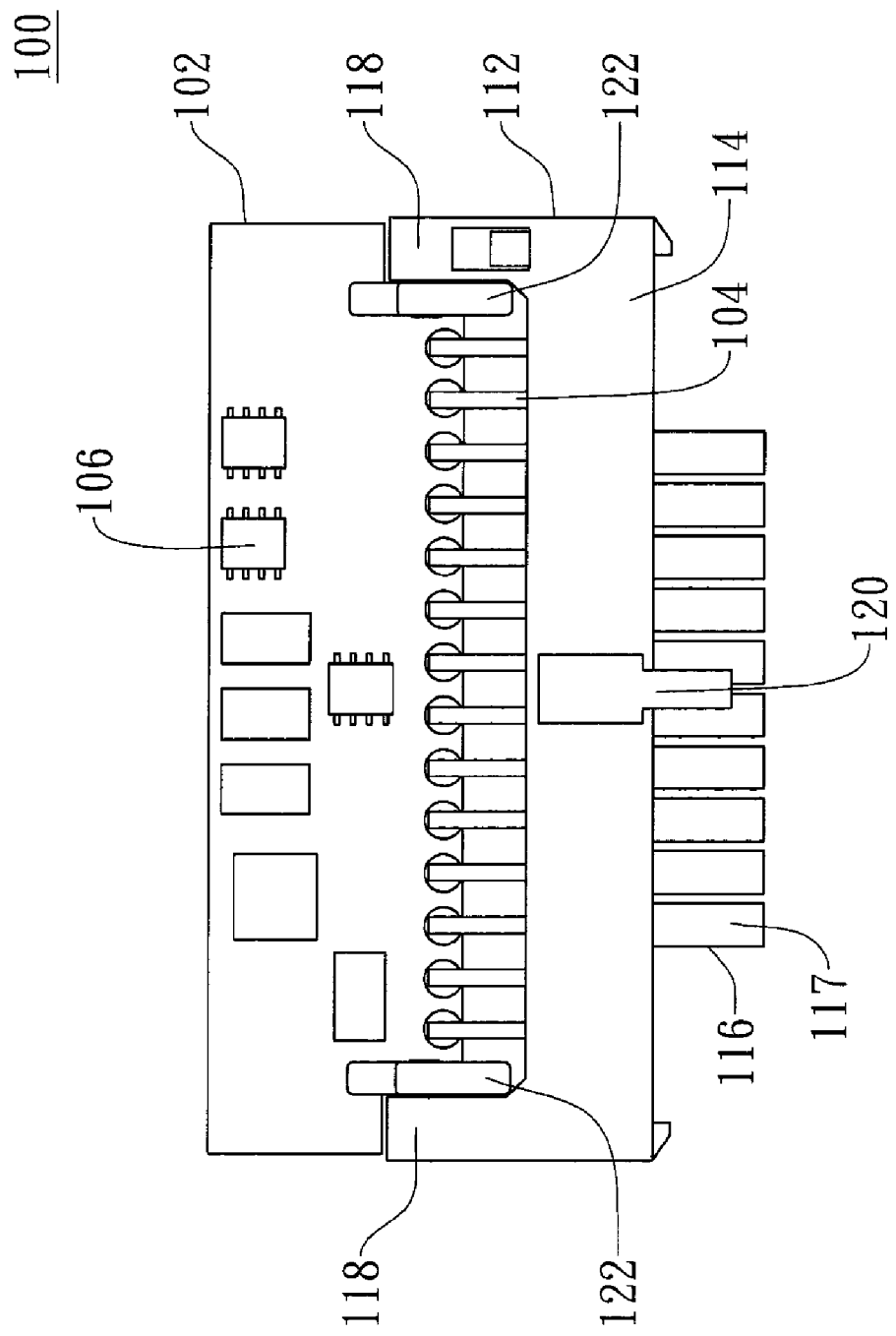
FIG. 1 is the front view of a mini power supply module in accordance with one embodiment of present invention.

Please refer to FIG. 1 which is illustrating the front view of a mini power supply module in accordance with the embodiment of present invention. As shown in the figure, the mini power supply module 100 of present invention substantially includes a circuit board 102 and a power connector 112 which are electrically connected and pivotally adjoined with each other by flexible coupling members 104. In the embodiment, circuit board 102 is a rectangular plate with a variety of functional electronic devices 105 provided thereon to perform the functions of said circuit board 102, such as rectification, filtering, voltage regulation and transformation, etc.

Figure 6C:
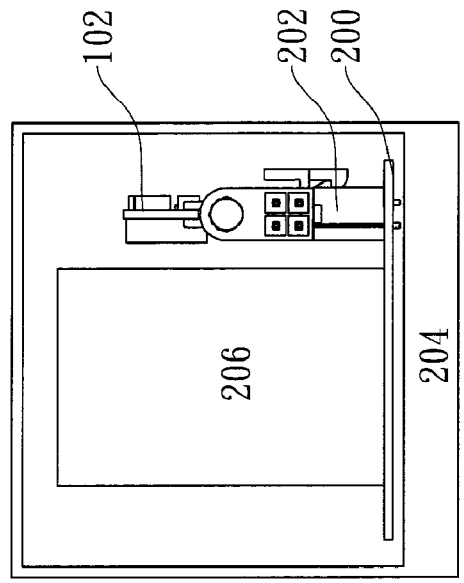
FIG. 6A~6C are the schematic views illustrating the mini power supply module of present invention connected with another power connector on motherboard.
Figure 6A:
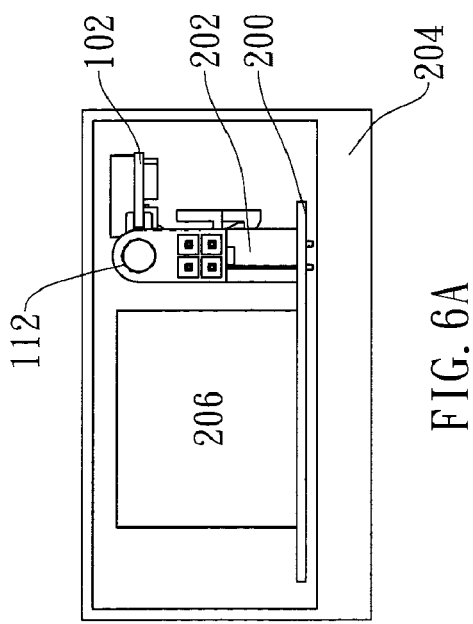
Figure 6B:
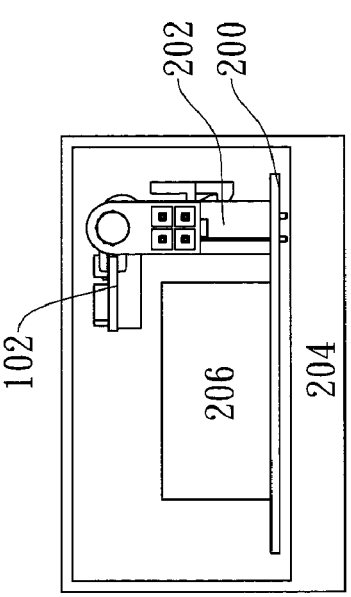

The power connector 112 includes a base 114 and a contact terminal 116. One of the side of the base 114 is adjoined with circuit board 102, and the other side of said base 114 is used to connect with another mating connector (such as the connector 202 shown in FIG. 6A~6C) on the motherboard. The contact terminal 116 is composed of a plurality of aligned pin contacts 117. As power connector 112 is connected with motherboard, those pin contacts 117 are inserted and received into the sockets of the corresponding connector on the motherboard to establish electrical connection. For example, the power connector 112 may be a 24-pin ATX main power male connector, while the corresponding connector on the motherboard may be a 24-pin ATX main power female connector. The two connectors may be mated with each other to establish electrical connection therebetween for power transmission. It is noted that the power connector 112 in other embodiment may be the connector with different specification. For example, power connector 112 may be 20-pin ATX main power male connector. In addition, the power connector 112 may be provided with a locking member 120 to snap-fit with a corresponding locking member on the connector of the motherboard for securing said power connector 112 on the motherboard when the power connector 112 is connected therewith, as shown in FIG. 6A~6C.

Figure 2:
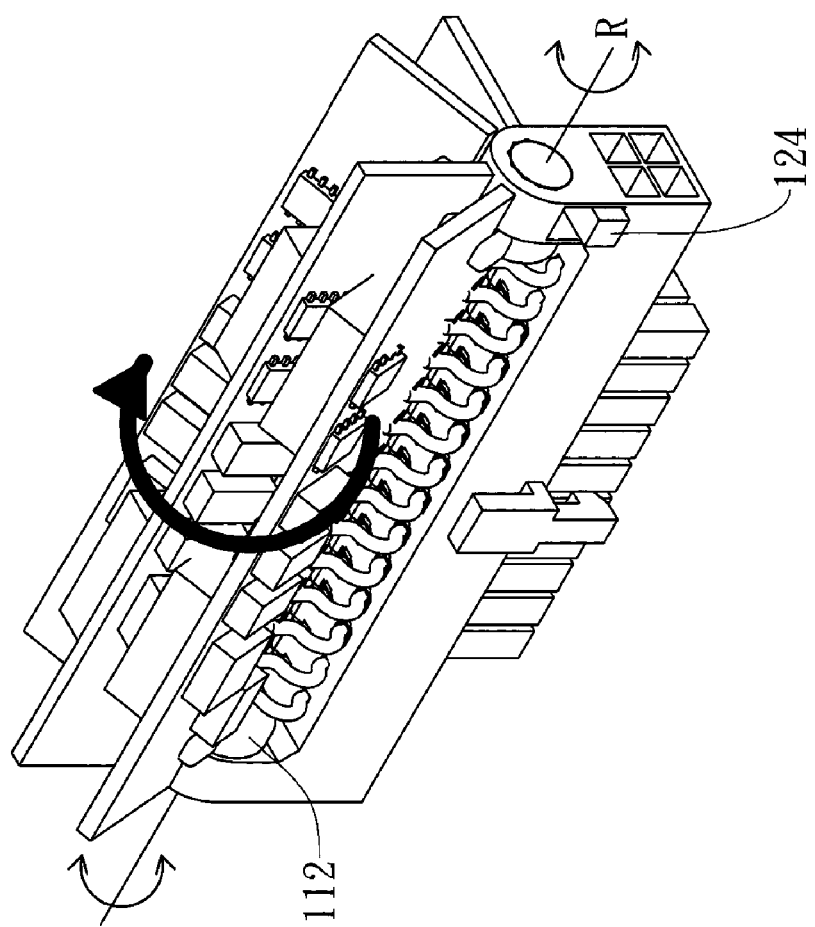
FIG. 2 is the perspective view of the mini power supply module shown in FIG. 1.

In present invention, both the opposite ends of the base 114 are provided with a protrusion 118 which is extending upwardly therefrom. Said protrusion 118 is provided to place or form the orientating mechanism of present invention. The orientating mechanism of present invention is used to form the specific included angle between circuit board 102 and power connector 112. For example, as the exemplary embodiment shown in FIG. 1, the inner side of two protrusions 118 is provided with a hinge member 122 which is mechanically connected to both ends of said circuit board 102 and may rotate pivotally on the protrusion 118. Please refer to FIG. 2, which is illustrating a perspective view of the mini power supply module shown in FIG. 1. The hinges 122 on both ends of the power connector 112 may define a rotating axis R. The axis R is parallel to the adjoining interface between circuit board 102 and power connector 112. Thus, circuit board 102 may rotate pivotally around said rotating axis R on the power connector 112 (as indicated by the arrow in the figure) to form any desired included angle between said circuit board 102 and said power connector 112. Additionally, the power connector 112 may be provided with a latch member 124 which may fix the included angle between said power connector 112 and said circuit board 102 once the circuit board 102 is rotated pivotally to a desired orientation. The coupling members 104 connecting circuit board 102 and power connector 112 are flexible material, such as wirings or clips, which may maintain the electrical connection therebetween while the circuit board 102 is rotating on the power connector 112.

Figure 3:
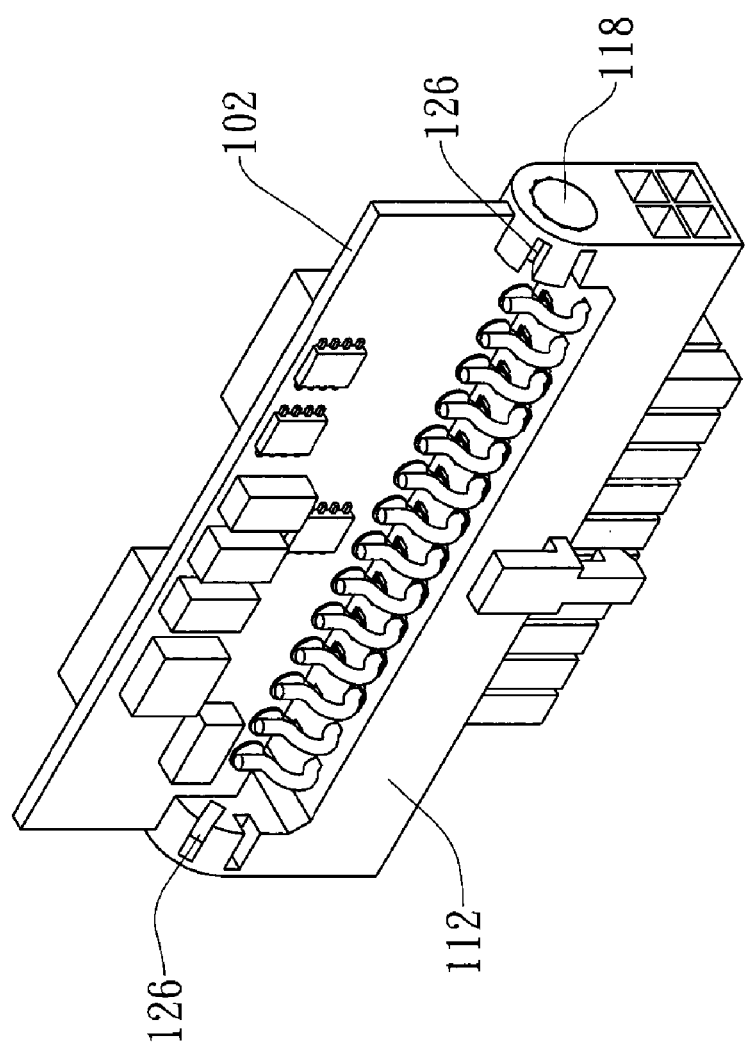
FIG. 3 is the perspective view of the mini power supply module in accordance with another embodiment of present invention.

The present invention may utilize other form of orientating mechanism other than the hinge member to form the desired angle between circuit board 102 and power connector 112. FIG. 3 illustrates another aspect of mini power supply module in accordance with the exemplary embodiment of present invention. In this embodiment, a plurality of slots 126 is formed on the two protrusions 118 of power connector 112. Those slots 126 are provided to receive and hold the circuit board 102. As show in figure, a plurality of slots 126 are formed at different position along the cambered surface of protrusion 112 on the power connector 112, thus the included angle (including but not limited to 180°, 135°, and 90°. The angle in the figure is 180°) between circuit board 102 and power connector 112 may be altered depending on the slot 126 into which the circuit board 102 is inserted.

Figure 4:
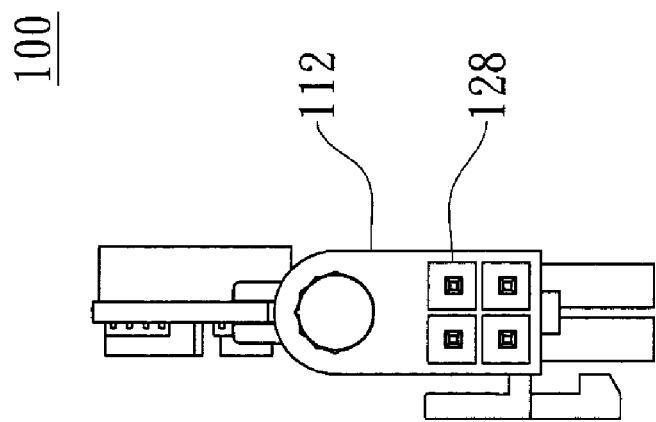
FIG. 4 is the side view of a mini power supply module in accordance with the embodiment of present invention.

Refer now to FIG. 4, which is illustrating the side view of mini power supply module 100 in present invention. As shown in the figure, an input port 128 may be further included on the base 118 of the power connector 112 of the mini power supply module 100 in present invention. Input port 128 is provided to receive the input of an external power source, such as the electrical energy from utility electricity or uninterrupted power system. For example, a 4-pin 12V P4 female connector used to mate and receive a 4-pin 12V P4 male connector may be formed on one end of base 118 of power connector 112 shown in the figure. It is understood that the connector with other specifications may also be used in present invention, which includes but not limits to 4-pin ATX 12V P4 connector, 4-pin parallel connector, 4-pin floppy drive connector, 6-pin AUX connector, and so on.

In addition to input port 128, an output port may be provided on the base 118 of power connector 112 for transmitting the electrical energy to the peripheral devices other than motherboard. For example, the end opposite to input port 128 on the base 118 may be provided with a 4-pin 12V P4 female connector (not shown) to function as an output port to transmit electrical energy to the peripheral devices, such as fans, hard disk, floppy drive. It is noted that in other embodiment of present invention, the power connector 112 may include one or more output ports, and those output ports may be provided or formed on the portion other than the two opposite ends of the base 118, such as the front side or the top surface of said base 118. Those output ports may conform to other connector specification, which includes but not limits to 4-pin 12V P4 connector, 4-pin parallel connector, 4-pin floppy drive connector, 6-pin AUX connector, and so on.

In the implementation, a plurality of couplings is formed between circuit board 102 and power connector 112 via coupling members to establish the electrical connection therebetween. The mini power supply module 100 including circuit board 102 and power connector 112 is connected with another corresponding connector on the motherboard. The terminal of an external power source is inserted into the input port 128 on one end of the base 114 of power supply module 100 to transmit the unregulated electrical energy into the mini power supply module 100. The voltage of said unregulated electrical energy may be a single, rated value, such as 110V or 220V of the utility voltages. The inputted voltage may also be in specific voltage range, for example, ranged from 5~76V. The inputted electrical energy from the power source may be transmitted to motherboard through the wirings inside the base 114 of said power connector 112. And also, said inputted electrical energy may be regulated and transformed by the circuit board 102 of mini power supply module 100. For example, the voltage of inputted electrical energy may be transformed to regulated voltage such as 3.3V, 5V, −5V, 5VSB, 12V, and −12V. The regulated electrical energy is then transmitted to motherboard through the contact terminal 116 of the power connector, or may be transmitted to other peripheral devices through the output ports provided on the power connector 112 for supplying necessary energy.

Figure 5:
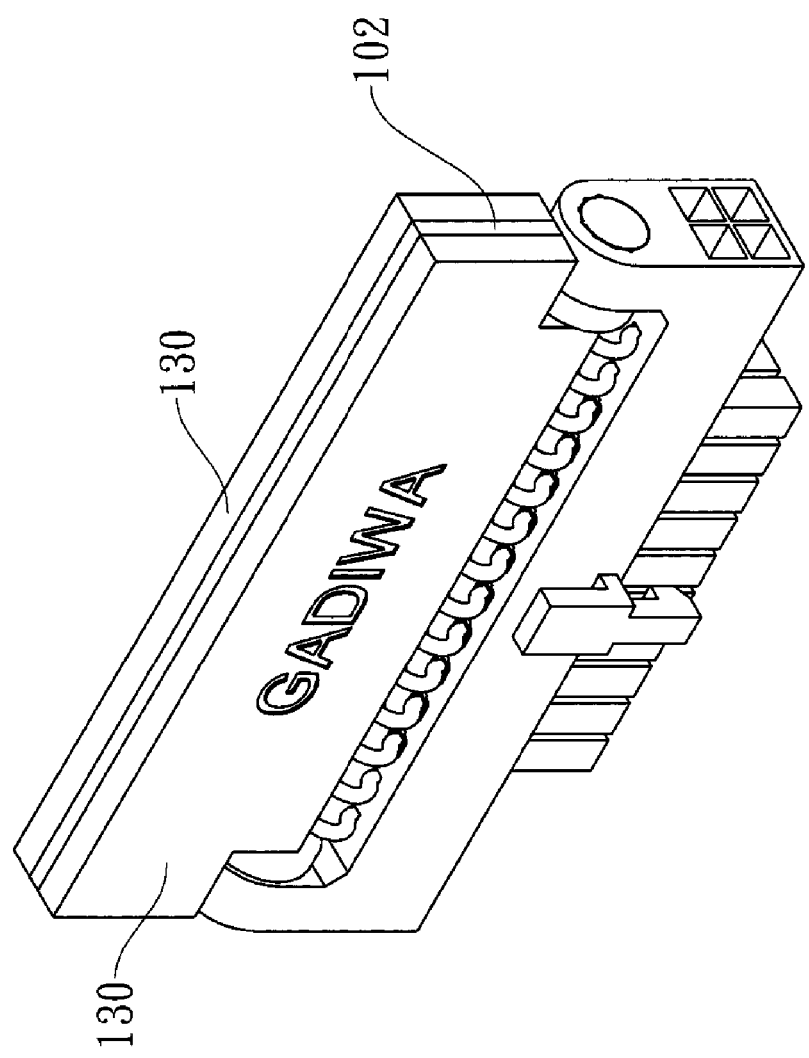
FIG. 5 is the perspective view of a mini power supply module with shield components covering thereon in accordance with the embodiment of present invention.

Please refer now to FIG. 5, which is illustrating the perspective view of the mini power supply module having shield components provided thereon in accordance with the embodiment of present invention. As shown in the figure, both sides of the circuit board 102 may be provided optionally with shields 130. The shield 130 is made of aluminum alloy, copper alloy, carbon steel, or flexible silicone rubber to facilitate the heat dissipation of mini power supply module 100 and protect the circuit board 102 from being damaged. Furthermore, the appearance of shield 130 may be used freely to further enhance the product value. For example, the shield 130 may be engraved with product logo (ex. "GADIWA" shown in the figure) or may have a novel appearance design for better user experience.

In general computer system, the motherboard is disposed and installed with various components and/or devices, such as all kinds of functional chips, passive components, processors, memory, fans, and/or expansion cards. Such components and/or devices may occupy a portion of installation space above the motherboard such that it's not easy for conventional mini power supply/module to install on the motherboard. The purpose of present invention is to provide a rotatable mini power supply module whose angle between circuit board and power connect may be altered by rotating the circuit board to desired orientation for better accommodating different interior arrangements of the system case. This kind of design may improve the flexibility and adaptability of conventional mini power supply module in the aspect of space utilization. For example, please refer to FIG. 6A~6B, which is the schematic view illustrating the mini power supply module 100 connected with another power connector 202 on the motherboard. In this embodiment, the circuit board 102 may be pivotally rotated on the power connector 112 via the orientating mechanism to form an angle (ex. 90° shown in the figure) between circuit board 102 and power connector 112 if the height of system case 204 is insufficient to receive the whole mini power supply module 100 having its circuit board 102 and power connector 112 coplanar and connected with the connector 202 on the motherboard 200. Therefore, the problem of insufficient installation space is solved in present invention. Alternatively, as shown in FIG. 6C, the circuit board 102 may be pivotally rotated to specific orientation to allow appropriate connection of mini power supply module 100 with the connector 200 of mother board 200 if there is device occupying too many space on the motherboard in the system case.

It is to be understood that the foregoing general description is exemplary and explanatory only and is not restrictive of the invention as claimed. Various alterations and modifications made to the embodiments without departing from the spirit of the present invention should still remain within the scope of the following claims. The components in the drawings are not necessarily to scale, emphasis instead being placed upon illustrating the principles of the invention. Certain proportions within the illustrations may be exaggerated, while other proportions may be minimized. Accordingly, the invention resides in the claims hereinafter appended.

What is claimed is:

1. A mini power supply module, comprising:
   a power connector including an input port to receive the input of a power source and a contact terminal to mate with a corresponding connector on the motherboard for supplying electrical energy to said motherboard;
   a circuit board electrically connected and adjoined with said power connector through at least one coupling part, said circuit board is provided to transform the input voltage of said power source into predetermined, regulated voltage and to transmit the regulated input of said power source to said power connector; and
   an orientating mechanism provided on said power connector to change the included angle between said power connector and said circuit board.

2. The mini power supply module of claim 1, wherein said orientating mechanism is a hinge for providing mechanical connection between said circuit board and said power connector and enabling said circuit board to pivotally rotate on said power connector.

3. The mini power supply module of claim 2, further comprising a latch provided on said hinge to fix the included angle between said circuit board and said power connector.

4. The mini power supply module of claim 1, wherein said orientating mechanism is provided with a plurality of slots to be inserted by said circuit board, the included angle between said circuit board and said power connector depends on the slot into which said circuit board is inserted.

5. The mini power supply module of claim 1, further comprising at least one output port provided on said power connector to transmit electrical energy to peripherals.

6. The mini power supply module of claim 1, further comprising a shield covering on said circuit board for protection and heat dissipation.

7. The mini power supply module of claim 1, wherein said coupling part is wiring or clip.

8. The mini power supply module of claim 1, wherein the input voltage of said power source is a single, rated value.

9. The mini power supply module of claim 1, wherein the input voltage of said power source is ranged from 5~76V.

10. The mini power supply module of claim 1, wherein said contact terminal of power connector includes ATX 20 pin connector and ATX 24 pin connector.

11. The mini power supply module of claim 1, wherein said output port includes ATX 4 pin 12 V P4 connector, 4 pin parallel connector, 4 pin floppy driver connector, and 6 pin AUX connector.

12. The mini power supply module of claim 1, wherein the voltage of said regulated input is 3.3V, 5V, −5V, 12V, or −12V.

\* \* \* \* \*